3,395,147
NOVEL TRIAZINE COMPOUNDS

John H. Cornell, Jr., Arlington, Mass., assignor to Monsanto Research Corporation, St. Louis, Mo., a corporation of Delaware
No Drawing. Filed Feb. 25, 1966, Ser. No. 529,966
2 Claims. (Cl. 260—248)

ABSTRACT OF THE DISCLOSURE

Novel 2,4,6 tris(alkynyloxy)-s-triazines of the following formula:

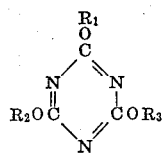

where $R_1$, $R_2$ and $R_3$ represent the same or different unsubstituted alkynyl radicals of from 3 to 8 carbon atoms. The compounds are useful as biological toxicants such as defoliants, herbicides and mammalian toxicants.

---

This invention relates to the reaction of 2,4,6-trihalo substituted s-triazine with alkyn-1-ols and to the products thereof.

It is an object of this invention to provide new and useful 2,4,6 tris(alkynyloxy)-s-triazines.

It is another object of this invention to provide new compounds useful as biological toxicants, such as, defoliants, herbicides and mammalian toxicants.

These and other objects will become apparent as a detailed description of the invention proceeds.

According to the invention there are prepared new and useful compounds having the formula:

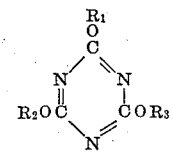

wherein each of $R_1$, $R_2$ and $R_3$ represents the same or different unsubstituted alkynyl radicals of from 3 to 8 carbon atoms.

The novel compounds may be prepared in a variety of ways. A preferred method is by simply contacting the 2,4,6-trihalo substituted s-triazine with the desired alkyn-1-ol until reaction is complete, as illustrated by the following equations.

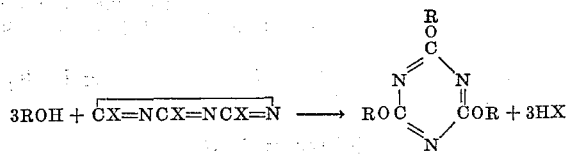

or in cases where the alkynyl radicals are different.

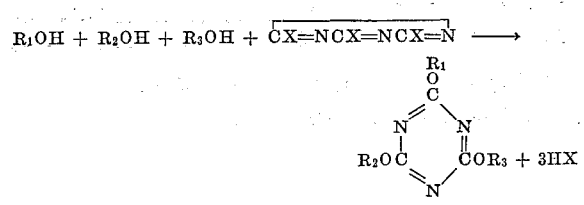

wherein each of $R_1$, $R_2$ and $R_3$ are as defined above and X represents a member selected from the class consisting of chlorine and bromine.

There are shown below a number of the specific new compounds of the invention. It is not intended that there by a complete listing of all the compounds of the invention, but that it merely be illustrative thereof: 2,4,6-tris(2-propynyloxy)-s-triazine, 2,4,6 - tris(2-butynyloxy)-s-triazine, 2,4,6-tris(3-butynyloxy)-s-triazine, 2,4,6-tris(2-pentynyloxy)-s-triazine, 2,4,6 - tris(3-pentynyloxy)-s-triazine, 2,4,6-tris(4-pentynyloxy)-s-triazine, 2,4,6-tris(2-hexynyloxy) - s - triazine, 2,4,6-tris(3-hexynyloxy)-s-triazine, 2,4,6 - tris(4-hexynyloxy)-s-triazine, 2,4,6-tris(5-hexynyloxy)-s-triazine, 2,4,6 - tris(2-heptynyloxy)-s-triazine, 2,4,6-tris(3-heptynyloxy)-s-triazine, 2,4,6-tris(4-heptynyloxy)-s-triazine, 2,4,6 - tris(5-heptynyloxy)-s-triazine, 2,4,6-tris(6-heptynyloxy)-s-triazine, 2,4,6-tris(2-octynyloxy)-s-triazine, 2,4,6-tris(3-octynyloxy)-s-triazine, 2,4,6-tris(4-octynyloxy)-s-triazine, 2,4,6 - tris(5-octynyloxy)-s-triazine, 2,4,6-tris(6-octynyloxy)-s-triazine, 2,4,6-tris(7-octynyloxy)-s-triazine, 2 - (2-propynyloxy)-4,6-bis(7-octynyloxy) - s - triazine, 2-(3-butynyloxy)-4-(2-propynyloxy)-6-(2-pentynyloxy)-s-triazine, 2,4 - bis(3-pentynyloxy)-6-(5-hexynyloxy)-s-triazine, 2,4-bis(2-butynyloxy)-6-(pentynyloxy)-s-triazine, and so forth.

The alkyn-1-ols are known compounds which may be prepared in a variety of ways. Useful alkynes which may be used to prepare the novel compounds are, for example: 2-propyn-1-ol, 2-butyn-1-ol, 3-butyn-1-ol, 2-pentyn-1-ol, 3-pentyn-1-ol, 4-pentyn-1-ol, 2-hexyn-1-ol, 3-hexyn-1-ol, 4-hexyn-1-ol, 5-hexyn-1-ol, 2-heptyn-1-ol, 3-heptyn-1-ol, 4-heptyn-1-ol, 5-heptyn-1-ol, 6-heptyn-1-ol, 2-octyn-1-ol, 3-octyn-1-ol, 4-octyn-1-ol, 5-octyn-1-ol, 6-octyn-1-ol, 7-octyn-1-ol, and so forth.

The new compounds of this invention may be prepared by simply contacting the desired alkyne with the s-triazine compound until reaction is complete. It is an advantage in moderating the reaction to add one of the reactants slowly and gradually to the other, though the reactants may be mixed all at once, together with a solvent or diluent if desired.

Solvents or diluents which may be used to moderate the reaction and/or to facilitate stirring the mixture, and so forth, are tertiary amines for example, pyridine, trimethylamine and triethylamine.

Molar ratios of the reactants may vary. Generally, the molar ratio of alkyne to triazine may vary from 1:10 to 10:1, though a 3:1 ratio is preferred. It is an advantage in obtaining higher yields to add an excess of one of the reactants, excess reactant may then be removed at the end of the reaction by, for example, distillation or extraction.

Generally, the reaction proceeds at ambient temperatures. Useful temperatures for preparing the novel compounds are, for example, the reflux temperature of the reaction mixture where low boiling solvents are employed, or from any temperature just above the freezing point up to just below the decomposition point of the ingredients of the reaction mixture. However, a reaction temperature ranging from 0° to 10° C. is preferred for moderating the reaction. No catalyst is required. Atmospheric pressure is satisfactory for conducting the reaction, though sub- or super-atmospheric pressures may be used if desired, ranging from 0.05 millimeter of mercury up to about 5,000 pounds per square inch. Reaction time may vary. Generally, the reaction time will depend on the nature of the reactants used and the reaction temperature. Ordinarily reaction time will vary from less than one minute up to several hours. Isolation of the product may be accomplished using standard procedures, such as distillation, extraction or crystallization, for example.

3

The novel compounds provided by the invention are generally stable, well defined products useful for a wide variety of industrial and agricultural uses, for example, 2,4,6-tris(2-propynyloxy)-s-triazine is useful as a mammalian toxicant and herbicide, and is particularly effective as a defoliant.

This invention will be further described with reference to the following specific examples. These examples are given for purposes of illustration only and are not to be taken as in any way restricting the invention.

EXAMPLE 1

This example illustrates the preparation of a compound in accordance with this invention.

To a reaction flask containing a mixture consisting of 74 grams (g.) (about 0.4 mole) of 2,4,6-trichloro-s-triazine and 76 g. (about 1.4 moles) of 2-propyn-1-ol at a temperature of 5° C., is added dropwise over a five-hour period 160 g. (about 2 moles) of pyridine. The reaction flask containing the mixture is placed into an acetone-Dry Ice bath to maintain the reaction temperature below 10° C. during addition of the pyridine. The reaction mixture is next stirred for one hour at a temperature below 10° C., removed from the bath and allowed to heat up to room temperature, diluted with 80 milliliters (ml.) of water to dissolve solids formed during addition, acidified with 6 N HCl, stirred and filtered. The crude, solid product thus obtained is purified by recrystallizing it from both benzene and ethanol.

The resultant product is 2,4,6-tris(2-propynyloxy)-s-triazine, a uniformly reddish-brown crystalline product weighing 50 g. (about 52% theoretical yield) and melting at 79.5–80.5° C.

Elemental analysis confirms the assigned empirical formula:

$C_{12}H_9N_3O_3$—Percent calculated: C, 59.3; H, 3.7; N, 17.3. Percent found: C, 59.0; H, 3.7; N, 17.2.

EXAMPLE 2

To test defoliant activity, Black Valentine bean plants, four to a pot, are grown to the stage of having one mature trifoliate and one partially opened trifoliate, and then sprayed with 2,4,6-tris-(2-propynyloxy)-s-triazine as an aqueous emulsion, at a rate of one pound per acre (lb./a.) using a dilution of thirty gallons per acre (gal./a.), after which the plants are maintained in a greenhouse within temperature limits of 70°–90° F. The plants are defoliated in the 51–75% range by the triazine compound.

Defoliation in the 76–99% range is observed when the same compound is applied to soybean plants at the rate of 10 lbs./a.

EXAMPLE 3

This example illustrates the use of a compound of this invention for the control of plant species.

Aluminum pan flats are filled with mixtures of two-thirds one-quarter mesh sieved soil, and one-third sand. Over one-third of the soil surface of each pan are scattered 20 seeds each of different kinds of grasses; seeds of broadleaf plants were randomly scattered over the remaining surface. The seeds are then covered with soil to the pans top and the pan is sprayed with an aqueous solution of fertilizer and insecticide. The surfaces of the boxes are next sprayed with 30 ml. of a mixture of the 2,4,6-tris(2-propynyloxy)-s-triazine in acetone at a rate equal to 25 lbs./a. The pans are next placed in water and allowed to absorb moisture until the soil surfaces are completely moist, after which they are held in a greenhouse under standard conditions of moisture and sunlight. After ten days, the number and species of plants which have germinated and grown are observed. The triazine compound produces substantially complete suppression of germination and growth on pigweed, crabgrass and foxtail while producing no effect on rye and brome grasses.

EXAMPLE 4

This example illustrates the use of a compound of this invention as a mammalian toxicant.

The triazine compound provided as described in Example 1 is placed in suspension by mixing it with a 0.5% methyl cellulose solution and diluting the mixture with distilled water to provide a suspension containing the compound at a rate of 10 mg./ml. This liquid is further diluted with distilled water to provide suspensions of the novel compound which are injected into mice intravenously. At 316 milligrams per kilogram (mg./kg.) (31.6 ml./kg.), the animals are killed. At the lower rates of 100 and 31.6 mg./kg. (10 and 3.16 ml./kg., respectively) the mice exhibit atoxia and decreased activity.

The new compounds of this invention are generally applied for toxicant use in the form of sprays or aerosols. Useful sprays may be prepared by dispersing or dissolving the present products in water with the aid of a wetting agent, to prepare aqueous dispersions or solutions which may be employed as by sprays. For example a solution containing cyclohexanone and a polyalkylene glycol ether long chain alkylbenzene sulfonate emulsifier may be used to prepare such dispersion or emulsion. The products may also be applied to plants as oil-in-water emulsion sprays. The present products may also be applied to plants from aerosol bombs. Instead of employing liquid as carriers and diluents, herbicidal dusts which contain the present novel compounds as active ingredient may be prepared, for example, by incorporating the new products with a solid carrier such as talc, bentonite, fuller's earth, and so forth.

The concentration of the toxicant compound in the composition as applied will vary with the active ingredients, the manner of application, the species to be destroyed and the resistance of the organism to be sprayed, for example, and formulation and ratio of application are suitably adjusted in accordance with these factors.

It is apparent that this invention may be extended to areas beyond those specifically described and that many widely differing embodiments may be made without departing from the spirit and scope thereof as defined herein. Therefore, it is not intended to be limited except as indicated by the appended claims.

What is claimed is:
1. A compound of the formula:

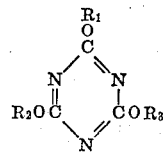

wherein each of $R_1$, $R_2$, and $R_3$ represents the same or different unsubstituted alkynyl radicals of from 3 to 8 carbon atoms.

2. The compound of claim 1 wherein each of $R_1$, $R_2$, and $R_3$ represents 2-propynyl.

References Cited

UNITED STATES PATENTS 2,631,148   3/1953   Nelb _____ 260—248
3,244,709   4/1966   D'Alelio _____ 260—248

JOHN D. RANDOLPH, *Primary Examiner.*

J. M. FORD, *Assistant Examiner.*